(12) United States Patent
Farha et al.

(10) Patent No.: US 11,192,439 B2
(45) Date of Patent: Dec. 7, 2021

(54) BATTERY ASSEMBLY WITH PLATE HAVING COMPRESSION LIMITING FEATURE

(71) Applicant: Ford Global Technologies, LLC, Dearborn, MI (US)

(72) Inventors: Eid Farha, Ypsilanti, MI (US); Temam Kedir, Ypsilanti, MI (US); Hari Krishna Addanki, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 16/541,506

(22) Filed: Aug. 15, 2019

(65) Prior Publication Data

US 2021/0046815 A1 Feb. 18, 2021

(51) Int. Cl.
| | |
|---|---|
| *B60K 1/04* | (2019.01) |
| *B60K 6/28* | (2007.10) |
| *B60L 50/64* | (2019.01) |
| *H01M 50/20* | (2021.01) |
| *B60L 50/60* | (2019.01) |
| *B60K 6/365* | (2007.10) |
| *B60K 6/26* | (2007.10) |

(52) U.S. Cl.
CPC ............... *B60K 6/28* (2013.01); *B60L 50/64* (2019.02); *B60L 50/66* (2019.02); *H01M 50/20* (2021.01); *B60K 6/26* (2013.01); *B60K 6/365* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC .......... B60L 50/64; B60L 50/66; B60K 1/04; H01M 50/20
See application file for complete search history.

(56) References Cited

U.S. PATENT DOCUMENTS

| | | |
|---|---|---|
| 10,003,052 B2 | 6/2018 | Paramasivam et al. |
| 2007/0009790 A1* | 1/2007 | Vutetakis ............ H01M 50/541 429/160 |
| 2016/0257219 A1* | 9/2016 | Miller .................... B60L 50/66 |
| 2016/0308178 A1 | 10/2016 | Petersen et al. |
| 2018/0337377 A1 | 11/2018 | Stephens et al. |

FOREIGN PATENT DOCUMENTS

| | | |
|---|---|---|
| EP | 3276730 A1 | 1/2018 |
| KR | 101725908 B1 | 5/2016 |

* cited by examiner

*Primary Examiner* — James A Shriver, II
*Assistant Examiner* — James J Triggs
(74) *Attorney, Agent, or Firm* — David B. Kelley; Carlson, Gaskey & Olds, P.C.

(57) ABSTRACT

This disclosure relates to a battery assembly with a plate having a compression limiting feature, and a corresponding electrified vehicle and method. An example battery assembly includes a wall having an inner surface and an outer surface. The wall also has a central opening. The battery assembly further includes a plate abutting the outer surface of the wall and covering the central opening. The plate also includes a main body and a post projecting from the main body toward the inner surface of the wall. Among other benefits, this arrangement limits compression of the wall and increases the ease of mounting components, such as electrical or fluid connectors, to the battery assembly.

17 Claims, 4 Drawing Sheets

(12) United States Patent
US 11,192,439 B2

BATTERY ASSEMBLY WITH PLATE HAVING COMPRESSION LIMITING FEATURE

TECHNICAL FIELD

This disclosure relates to a battery assembly with a plate having a compression limiting feature, and a corresponding electrified vehicle and method.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

SUMMARY

A battery assembly for an electrified vehicle according to an exemplary aspect of the present disclosure includes, among other things, a wall having an inner surface and an outer surface. The wall further has a central opening. The battery assembly further includes a plate abutting the outer surface of the wall and covering the central opening. The plate also includes a main body and a post projecting from the main body toward the inner surface of the wall.

In a further non-limiting embodiment of the foregoing battery assembly, an end of the post lies substantially in a plane defined by the inner surface of the wall.

In a further non-limiting embodiment of any of the foregoing battery assemblies, the wall includes a set of post openings, the set of post openings includes a post opening in the inner surface of the wall and a post opening in the outer surface of the wall aligned with post opening in the inner surface of the wall, and the post projects through the set of post openings.

In a further non-limiting embodiment of any of the foregoing battery assemblies, a fastener is affixed to the post.

In a further non-limiting embodiment of any of the foregoing battery assemblies, the fastener includes a threaded shaft and a head, the post includes a threaded bore, and the fastener is affixed to the post by threading the threaded shaft into the threaded bore.

In a further non-limiting embodiment of any of the foregoing battery assemblies, the head has a diameter greater than a diameter of the post opening in the inner surface.

In a further non-limiting embodiment of any of the foregoing battery assemblies, when the fastener is fully tightened, the head abuts the inner surface of the wall and the end of the post.

In a further non-limiting embodiment of any of the foregoing battery assemblies, the assembly includes a seal extending about the central opening and arranged between the plate and the outer surface of the wall.

In a further non-limiting embodiment of any of the foregoing battery assemblies, the seal is mounted to the main body of the plate.

In a further non-limiting embodiment of any of the foregoing battery assemblies, the plate includes a collar extending about a perimeter thereof, the seal is mounted to the collar, and the seal is spaced-apart from the main body of the plate by the collar.

In a further non-limiting embodiment of any of the foregoing battery assemblies, the assembly includes a connector mounted to the main body, the connector configured to electrically or fluidly connect a component outside the wall to a component inside the wall.

In a further non-limiting embodiment of any of the foregoing battery assemblies, the post is one of a plurality of posts projecting from the main body toward the inner surface of the wall.

In a further non-limiting embodiment of any of the foregoing battery assemblies, the post is integrally formed with the main body of the plate.

In a further non-limiting embodiment of any of the foregoing battery assemblies, the plate is made of aluminum.

An electrified vehicle according to an exemplary aspect of the present disclosure includes an electric machine configured to propel the electrified vehicle and a battery assembly configured to supply energy to the electric machine. The battery assembly is arranged according to any one or more of the foregoing paragraphs.

A method according to an exemplary aspect of the present disclosure includes, mounting a connector to a battery assembly by mounting the connector to a plate and connecting the plate to a wall of the battery assembly. The plate includes a post projecting from a main body toward an inner surface of the wall.

In a further non-limiting embodiment of the foregoing method, the step of mounting the connector the battery assembly includes threading a threaded fastener into a threaded bore of the post.

In a further non-limiting embodiment of any of the foregoing methods, the threaded fastener is threaded into the post from an interior of the battery assembly.

In a further non-limiting embodiment of any of the foregoing methods, when the threaded fastener is fully tightened, a head of the threaded fastener abuts a free end of the post and the inner surface of the wall.

In a further non-limiting embodiment of any of the foregoing methods, the method includes connecting, either electrically or fluidly, a component inside the battery assembly to a component outside the battery assembly using the connector.

DETAILED DESCRIPTION

This disclosure relates to a battery assembly with a plate having a compression limiting feature, and a corresponding electrified vehicle and method. An example battery assembly includes a wall having an inner surface and an outer surface. The wall also has a central opening. The battery assembly further includes a plate abutting the outer surface of the wall and covering the central opening. The plate also includes a main body and a post projecting from the main body toward the inner surface of the wall. This arrangement limits compression of the wall and increases the ease of mounting components, such as electrical or fluid connectors, to the battery assembly. These and other benefits will be appreciated from the below description.

Figure 1:
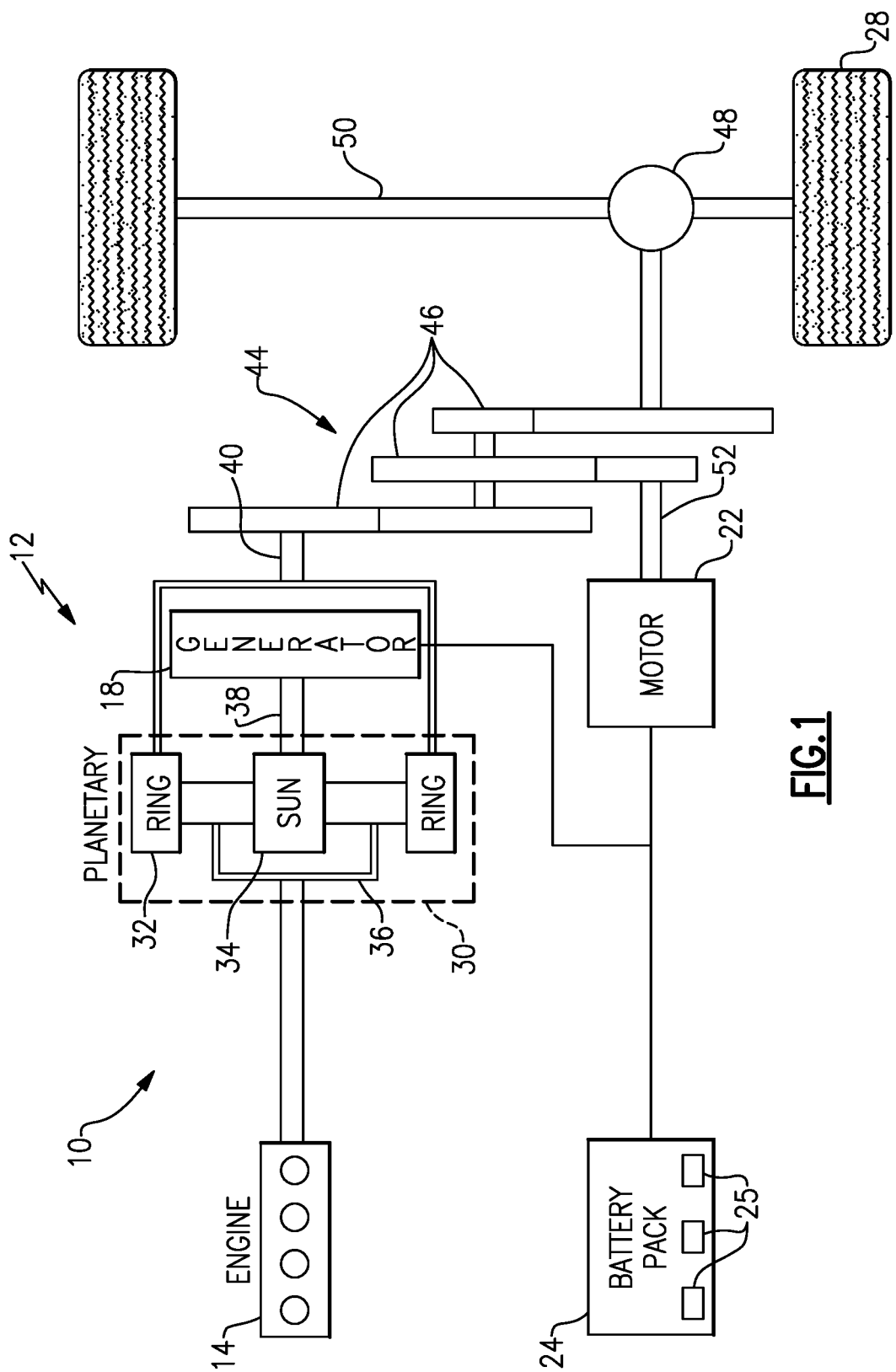
FIG. 1 schematically illustrates an example powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
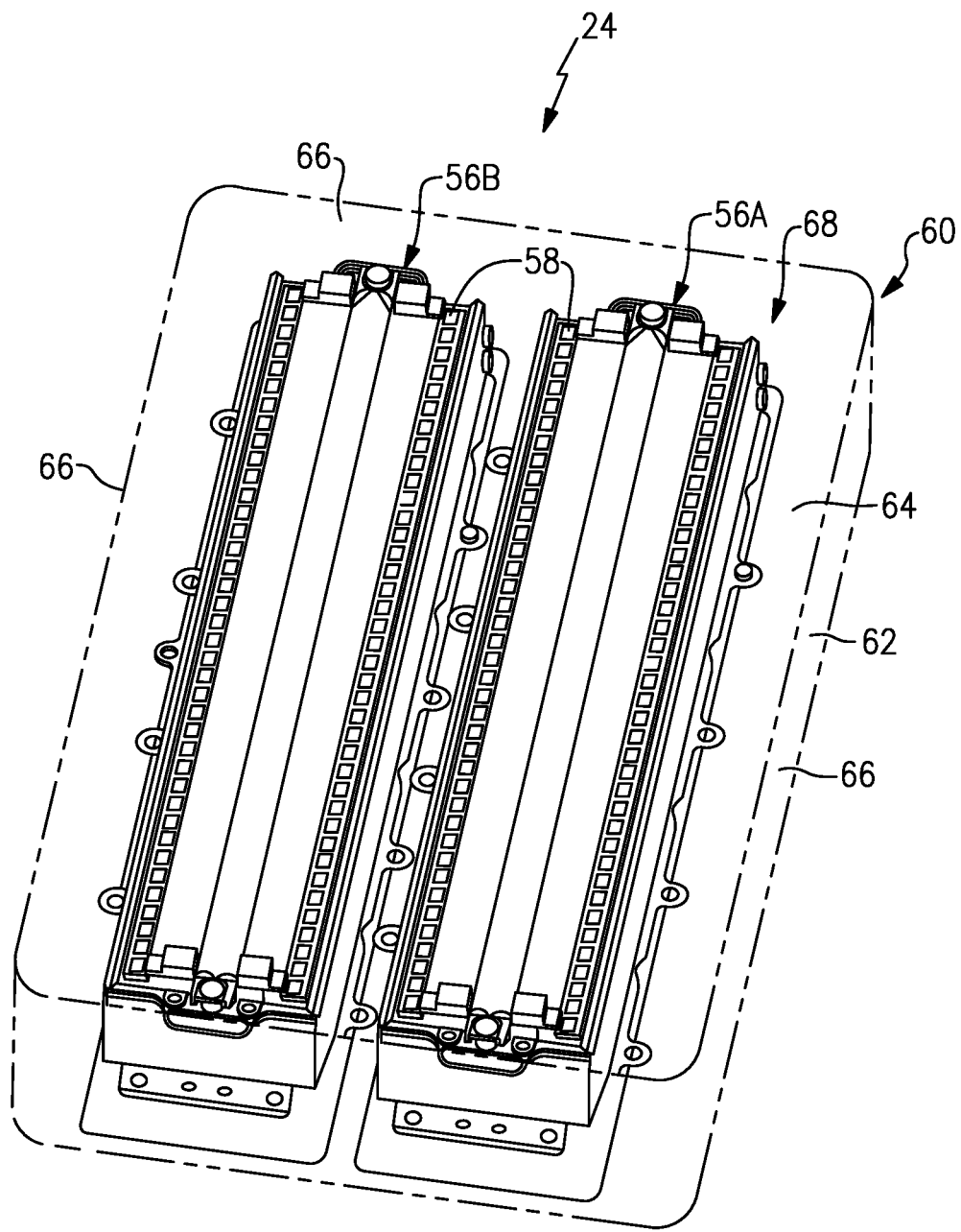
FIG. 2 schematically illustrates an example battery assembly of an electrified vehicle.

FIG. 2 illustrates additional detail of the battery assembly 24. The battery assembly 24 includes battery arrays, which can be described as groupings of battery cells, for supplying electrical power to various vehicle components. In this example there are two battery arrays 56A, 56B. Although two battery arrays 56A, 56B are illustrated in FIG. 2, the battery assembly 24 could include a single battery array or multiple battery arrays. In other words, this disclosure is not limited to the specific configuration shown in FIG. 2.

Each battery array 56A, 56B includes a plurality of battery cells 58 that may be stacked side-by-side along a span length (i.e., the largest dimension) of each battery array 56A, 56B. Although not shown in the schematic depiction of FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 (shown in phantom in FIG. 2) surrounds the battery arrays 56A, 56B. In one non-limiting embodiment, the enclosure assembly 60 includes a tray 62 and a cover 64 which establish a plurality of walls 66 that surround the interior 68 (i.e., area inside the walls 66). The enclosure assembly 60 may take any size, shape or configuration, and is not limited to the specific configuration of FIG. 2. The enclosure assembly 60 defines an interior 68 for housing the battery arrays 56A, 56B and, potentially, any other components of the battery assembly 24.

Figure 3:
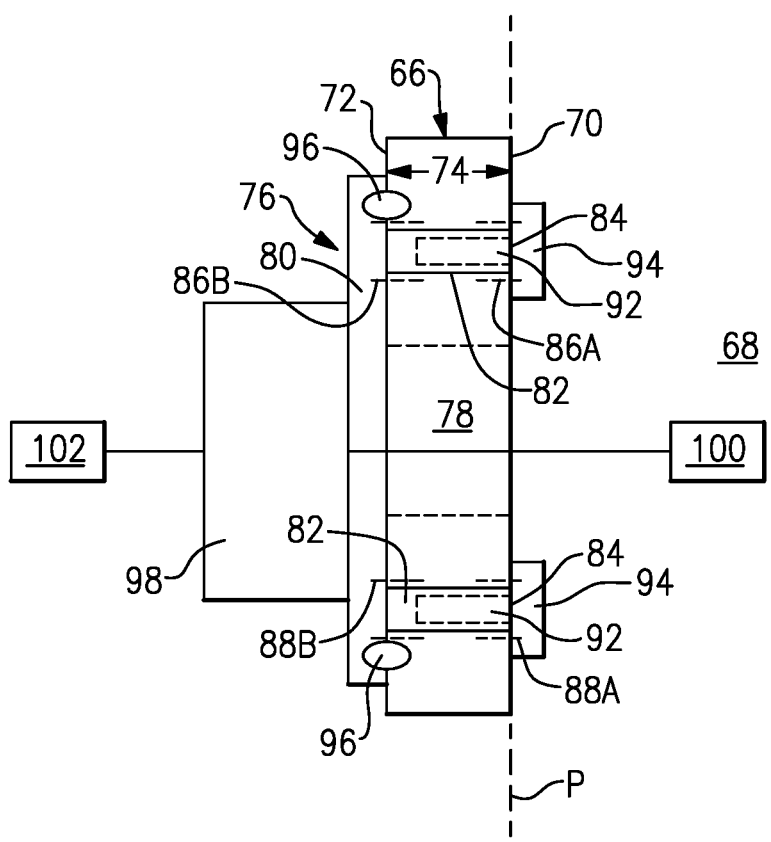
FIG. 3 schematically illustrates a first embodiment of a plate arranged relative to a wall of the battery assembly.

Detail of an example wall 66 is schematically illustrated in FIG. 3. While only one wall 66 is shown in FIG. 3, other walls 66 of the battery assembly 24 may be arranged as shown in FIG. 3. In the example of FIG. 3, the wall 66 is provided by an extrusion and includes an inner surface 70 and an outer surface 72 spaced-apart by a gap 74. In general, one or more walls 66 are arranged to enclose and seal the interior 68 such that it is air and water tight. In order to electrically or fluidly couple the interior 68 of the battery assembly 24 to components on the outside of the battery assembly 24, this disclosure includes a plate 76 configured to interface with the walls 66.

In particular, at least one of the walls 66 includes a central opening 78 therein. Specifically, the opening 78 is formed in the inner and outer surfaces 70, 72. The opening 78, in this example, is covered by the plate 76. In particular, the plate 76 is mounted to the wall 66 such that the plate 76 abuts the outer surface 72 and covers the central opening 78 from an outer side.

The plate 76 includes a main body 80 and a plurality of posts 82 projecting from the main body 80. The posts 82 project from the main body 80 toward the inner surface 70 of the wall 66. While FIG. 3 illustrates two posts 82, this disclosure extends to plates 76 with one or more posts.

Figure 5:
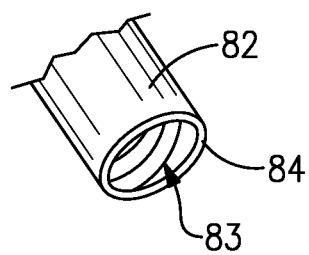
FIG. 5 is a close-up view of a free end of a post.

In this example, the posts 82 each have a free end 84 opposite the main body 80. The free ends 84 lie substantially in a plane P defined by the inner surface 70 of the wall 66. In other words, the free ends 84 of the posts 82 are coterminous with the inner surface 70 of the wall 66. Further, the posts 82 are arranged such that they extend through a set of openings in the wall 66. The posts 82 are substantially cylindrical, in this example, and are sized and dimensioned such that they are substantially rigid along a length thereof (i.e., in the left-and-right direction, relative to FIG. 3). Further, the posts 82 are configured to receive a fastener, such as a threaded fastener, and thus in this example the posts include threaded bores 83 (FIG. 5).

In FIG. 3, there is a first set of post openings receiving one of the posts 82 and a second set of post openings receiving another of the posts 82. The first set of post openings includes a post opening 86A in the inner surface 70 and a post opening 86B in the outer surface 72 aligned with the post opening 86A. Similarly, the second set of post openings includes a post opening 88A in the inner surface 70 and a post opening 88B in the outer surface 72. The post openings 86A-88B are sized such that the posts 82 may pass therethrough. The wall 66 may include a number of sets of post openings corresponding to the number of posts 82 on the plate 76.

In this example, the plate 76 is connected to the wall 66 by way of a plurality of fasteners 90. In particular, the fasteners 90 are threaded fasteners including a threaded shaft 92 and a head 94. The fasteners 90 are affixed to the posts 82 by threading the threaded shaft 92 into engagement with the threaded bores 83 of the posts 82. The fasteners 90 are threaded from the interior 68 of the battery assembly 24, in this example. The heads 94 of the fasteners 90 are sized such that they exhibit a diameter larger than a diameter of the post openings 86A-88B.

When the fasteners 90 are fully tightened, the heads 94 abut both the inner surface 70 of the wall 66 and the ends 84 of the posts 82. In this way, the posts 82 limit compression of the wall 66. In turn, lighter, less expensive materials may be selected for the wall 66, which reduces the overall cost of the battery assembly 24. Further, because the posts 82 substantially traverse the entire gap 74, ease of assembly is increased. Namely, because of the arrangement of the posts 82, the threaded bores 83 are easily located because they are readily visible through the openings 86A, 88B from the interior 68 of the battery assembly 24. Additionally, the likelihood that a fastener 90 will fall into the gap 74 and become lost is significantly reduced if not eliminated altogether.

When the fasteners 90 are fully tightened, a water and air tight seal is formed between the plate 76 and the outer surface 72 of the wall 66 by a seal 96. The seal 96 is made of an elastomeric material such as rubber and extends about the central opening 78 between the main body 80 of the plate 76 and the outer surface 72 of the wall 66. The seal 96 has a round cross-section, similar to that of an O-ring, but this disclosure extends to other types of seals, such as gaskets.

The plate 76, in one example, is integrally formed of aluminum (Al). In particular, the main body 80 and posts 82 are formed using a technique such as casting so that the plate 76 is a one-piece structure without any joints or seams. In one example, however, the seal 96 is attached to the plate 76 before the plate 76 is connected to the wall 66. In this sense, the plate 76 may be a two-piece component consisting of an elastomeric seal 96 and a seamless, metallic structure defining the main body 80 and the posts 82.

The plate 76 supports a connector 98 configured to electrically or fluidly connect a component 100 in the interior 68 of the battery assembly 24 to a component 102 outside the battery assembly 24. In one example, the connector 98 is an electrical connector configured to electronically connect the battery assembly 24 to a motor. Alternatively, the connector 98 may electronically connect the battery assembly 24 to an inverter, DC-to-DC converter, or another electronic component.

Figure 4:
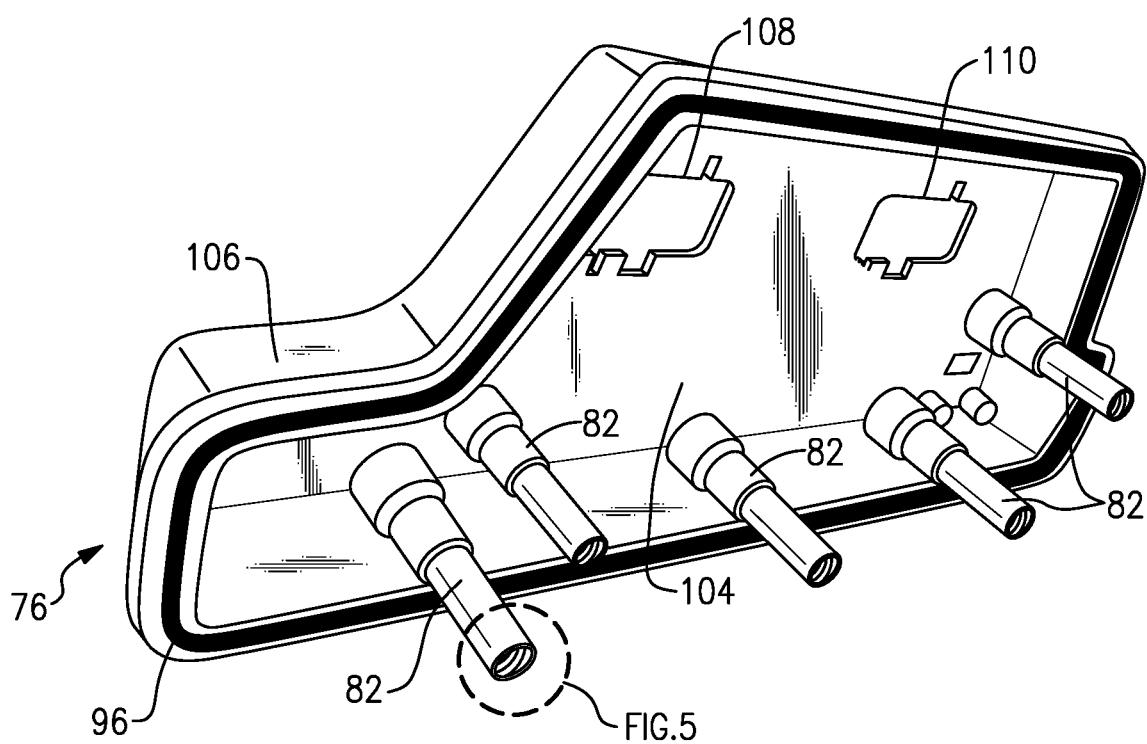
FIG. 4 illustrates a second embodiment of a plate.

In FIG. 3, the main body 80 of the plate 76 is substantially flat and planar. In FIG. 4, another example plate 76 includes a main body 104 which is substantially planar but further includes a collar 106 extending about a perimeter of the main body 104. Further, the seal 96 in the FIG. 4 example is attached to the collar 106. The collar 106 may include a groove configured to receive the seal 96. The main body 104 of the plate 76 includes two cutouts 108, 110, each of which is configured to receive a connector, such as the connector 98. In this way, in the embodiment of FIG. 4, the seal 96 and the connectors are spaced-apart from one another. While two cutouts are shown in FIG. 4, this disclosure extends to plates with one or more cutouts. This disclosure also extends to plates that interface with connectors in another manner. Further, the term cutout as used herein does not imply any particular manufacturing steps, meaning the plate could be cast with the cutouts, and the cutouts need not literally be cut out from the plate.

In the embodiment of FIG. 4, there are five posts 82 arranged substantially similarly to the posts described above in FIG. 3. As shown in FIG. 5, the posts 82 each include a threaded bore 83 beginning at the free end 84 and extending along the posts 82 toward the main body. This disclosure is not limited to threaded connections, however, and extends to other types of mechanical connections including press-fittings, for example.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations.

It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly for an electrified vehicle, comprising:
   a wall having an inner surface and an outer surface, the wall including a central opening; and
   a plate abutting the outer surface of the wall and covering the central opening, the plate including a main body and a post projecting from the main body toward the inner surface of the wall, wherein an end of the post lies substantially in a plane defined by the inner surface of the wall, wherein the wall includes a set of post openings, wherein the set of post openings includes a post opening in the inner surface of the wall and a post opening in the outer surface of the wall aligned with post opening in the inner surface of the wall, and the post projects through the set of post openings.

2. The battery assembly as recited in claim 1, wherein a fastener is affixed to the post.

3. The battery assembly as recited in claim 2, wherein:
   the fastener includes a threaded shaft and a head,
   the post includes a threaded bore, and
   the fastener is affixed to the post by threading the threaded shaft into the threaded bore.

4. The battery assembly as recited in claim 3, wherein the head has a diameter greater than a diameter of the post opening in the inner surface.

5. The battery assembly as recited in claim 4, wherein, when the fastener is fully tightened, the head abuts the inner surface of the wall and the end of the post.

6. The battery assembly as recited in claim 1, further comprising a seal extending about the central opening and arranged between the plate and the outer surface of the wall.

7. The battery assembly as recited in claim 6, wherein the seal is mounted to the main body of the plate.

8. The battery assembly as recited in claim 6, wherein:
   the plate includes a collar extending about a perimeter thereof,
   the seal is mounted to the collar, and
   the seal is spaced-apart from the main body of the plate by the collar.

9. The battery assembly as recited in claim 1, further comprising a connector mounted to the main body, the connector configured to electrically or fluidly connect a component outside the wall to a component inside the wall.

10. The battery assembly as recited in claim 1, wherein the post is one of a plurality of posts projecting from the main body toward the inner surface of the wall.

11. The battery assembly as recited in claim 1, wherein the post is integrally formed with the main body of the plate.

12. The battery assembly as recited in claim 1, wherein the plate is made of aluminum.

13. An electrified vehicle, comprising:
   an electric machine configured to propel the electrified vehicle; and
   a battery assembly configured to supply energy to the electric machine, the battery assembly comprising:
      a wall having an inner surface and an outer surface, the wall including an central opening and a plurality of sets of post openings, each set of post openings including a post opening in the inner surface of the wall and a post opening in the outer surface of the wall aligned with post opening in the inner surface of the wall;
      a plate abutting the outer surface of the wall and covering the central opening, the plate including a main body and a plurality of posts projecting from the main body through a respective one of the sets of post openings, each of the plurality of posts including a respective free end lying substantially in a plane defined by the inner surface of the wall, each of the posts including a threaded bore, wherein the plate is made of aluminum and is cast such that the posts are integrally formed with the main body;
      a plurality of fasteners each including a threaded shaft and a head, each fastener affixed to a respective post by threading the threaded shaft into the threaded bore such that when the fasteners are fully tightened the head abuts the free end of the respective post and the inner surface of the wall, the head of each fastener having a diameter greater than a diameter of a corresponding one of the post openings in the inner surface;
      a seal mounted extending about the central opening and arranged between the plate and the outer surface of the wall; and
      a connector mounted to the plate, the connector configured to electrically or fluidly connect a component outside the wall to a component inside the wall.

14. A method, comprising:
   mounting a connector to a battery assembly by mounting the connector to a plate and connecting the plate to a wall of the battery assembly, the plate including a post projecting from a main body toward an inner surface of the wall, wherein the step of mounting the connector the battery assembly includes threading a threaded fastener into a threaded bore of the post.

15. The method as recited in claim 14, wherein the threaded fastener is threaded into the post from an interior of the battery assembly.

16. The method as recited in claim 14, wherein, when the threaded fastener is fully tightened, a head of the threaded fastener abuts a free end of the post and the inner surface of the wall.

17. The method as recited in claim 14, connecting, either electrically or fluidly, a component inside the battery assembly to a component outside the battery assembly using the connector.

* * * * *